Dec. 26, 1961

L. W. ERATH 3,015,070

WIDEBAND TUBE-TRANSISTOR AMPLIFIER

Filed June 3, 1958

INVENTOR

LOUIS W. ERATH

BY

Burns, Doane, Benedict & Irons

ATTORNEYS 3,015,070

WIDEBAND TUBE-TRANSISTOR AMPLIFIER

Louis W. Erath, Houston, Tex., assignor, by mesne assignments, to Dresser Industries, Inc., Dallas, Tex., a corporation of Delaware Filed June 3, 1958, Ser. No. 739,563
3 Claims. (Cl. 330—3)

This invention relates to amplification of voltages, and more particularly to wideband amplifiers for amplifying voltages of frequencies from very low to high values of the order of megacycles.

In the past, wideband amplification has been accomplished by the use of R.-C. coupled circuits including vacuum tubes of very high transconductance. It has been desired to maintain the phase shift or time delay through the amplifier as small as possible, but yet to obtain as high gain as possible. In order to obtain high gain, the tubes selected for such work have interelectrode spacings which are very small, in order that the transconductance may be very high. Further, the tubes have been operated with very high plate currents of the order of 5 to 30 milliamperes, and with relatively low plate resistors of the order of 1,000 to 5,000 ohms. These combined factors result in relatively high grid current, since the grid current of an amplifying tube is determined by the total space current of the tube.

The design considerations referred to above have resulted in a widespread impression among amplifier designers that low grid current (high input impedance) is inherently associated with low frequency response and that wideband amplification cannot be obtained with negligible grid current.

On the other hand, designers desiring to obtain low grid current and high input impedance customarily provide amplifier tubes with very high plate or cathode resistors, in order to reduce the total space current and hence the grid current.

An inherent disadvantage in the use of high transconductance vacuum tubes for wideband amplification is that small interelectrode spacing results in high input capacity. The Miller effect further increases this capacity, with the result that phase change or delay becomes relatively high and disadvantageous.

The present invention results from the realization that small grid current and wideband amplification are not necessarily inconsistent, but rather that a tube designed for extremely low grid current can be employed in a wideband amplifier by using the tube as a voltage to current transducer, and by employing its output to drive a transistor, which is inherently a current-operated device. With a circuit of this kind, wideband amplification can be obtained with negligible phase change or delay.

The invention includes a wideband amplifier, employing the combination of a high input impedance vacuum tube and a directly-coupled transistor. In order to stabilize the circuit and to further increase the input impedance, series negative feedback is also employed.

The invention will now be more fully described in conjunction with preferred embodiments thereof shown in the accompanying drawing.

Figure 1:
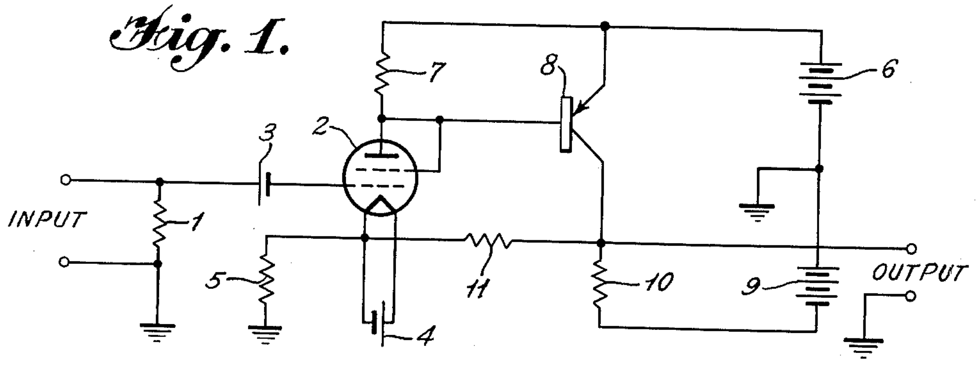
FIG. 1 is a schematic diagram of one embodiment of the invention.

Referring first to the apparatus of FIG. 1, the input signal voltage is developed across the grid resistor 1 of a vacuum tube 2. A conventional vacuum tube could be employed if a large plate resistor were employed and a fairly high plate voltage of the order of 30–40 volts used in order that extremely low grid current could be obtained. However, in the present circuit the gain of the input or vacuum tube stage can be unity or less, so that low transconductance is not important and tubes especially designed for low grid current can be employed. Such a tube is the type designated by Raytheon as the CK 5886. This tube has extremely low filament current, high emission stability, and low microphonics. The screen grid of the tube is connected to the plate, so that the tube is operated as a triode, and, when so operated, the tube has an unusually high ratio of transconductance to control grid current. The transconductance is of the order of 175, while the control gird current is nominally of the order of $2.5\times10^{-13}$ amperes. The capacity between control grid and all other electrodes is of the order of 2.2 micromicrofarads.

The apparatus of FIG. 1 employs a bias battery 3 connected between the control grid and grid resistor of the electrometer tube to supply the appropriate negative grid bias. The cathode of the tube is a filament heated by a small filament battery 4.

The cathode is connected to ground by a small resistor 5, while the anode is connected to the positive side of a plate voltage source 6 by a small plate resistor 7. The negative side of the plate voltage supply is connected to ground.

The anode of the electrometer tube is conductively connected to the base of a PNP junction transistor 8, and the emitter of the transistor is connected to the positive side of the plate supply 6. Bias for the collector of the transistor is obtained from a battery source 9 whose positive terminal is grounded and whose negative terminal is connected to the collector through resistor 10. The output of the amplifier is developed across resistor 10.

In order to stabilize the amplifier and to supply the other well known benefits of degenerative feedback, the junction between the transistor collector and resistor 10 is connected to the cathode of the electrometer tube through feedback resistor 11, thus furnishing series negative feedback.

Before describing the operation of the amplifier of FIG. 1, preferred values of the resistors will be given:

| | Ohms |
|---|---|
| $R_5$ | 1,000 |
| $R_7$ | 1,000 |
| $R_{10}$ | 3,300 |
| $R_{11}$ | 10,000 |

Bias battery 3 may be nominally of 3.5 volts, while plate battery 6 will be 13½ volts, and bias battery 9 may be 9 volts, in potential.

With the electrometer tube preferably employed, it is possible to use a plate resistor of the order of 1000 ohms, so that the bandwidth can be very high. As a matter of fact, it has been found that the amplifier of FIG. 1, employing the values of components listed above, has a bandwidth of the order of 2 megacycles, with a grid current of 1 micromicroampere. In contrast, an earlier more conventional amplifier designed for low grid current had a bandwidth of 0.1 megacycle and a grid current of 1,000 micromicroamperes. If a figure of merit determined by the ratio between the bandwidth and the grid current is calculated, it will be seen that the amplifier of FIG. 1 is about 20,000 times better than that of the previous design.

In operation of the apparatus of FIG. 1, the input impedance may be as high as desired, and even infinity. The electrometer tube operates as a voltage to current transducer, thus furnishing to the transistor, current for its operation. Actually, the tube is so operated that a loss in gain is suffered across the tube, but the transistor circuit compensates for this loss and provides a total gain in the amplifier.

The plate voltage supply is so small that internal ionization does not occur in the tube characteristics and the parameters of its circuit are such that the input impedance is extremely high. The amplifier has frequency response characteristics extending into the megacycle range, so that it is truly a wideband amplifier.

The gain of the amplifier of FIG. 1 is approximately the ratio of the feedback resistor $R_{11}$ to the cathode resistor $R_5$. With the illustrative values given, the gain of the amplifier is of the order of 10.

It will be understood that the illustrative values given for the resistors and voltage sources of the apparatus of FIG. 1 are not limiting of the invention, but merely describe one preferred design of the apparatus.

Figure 2:
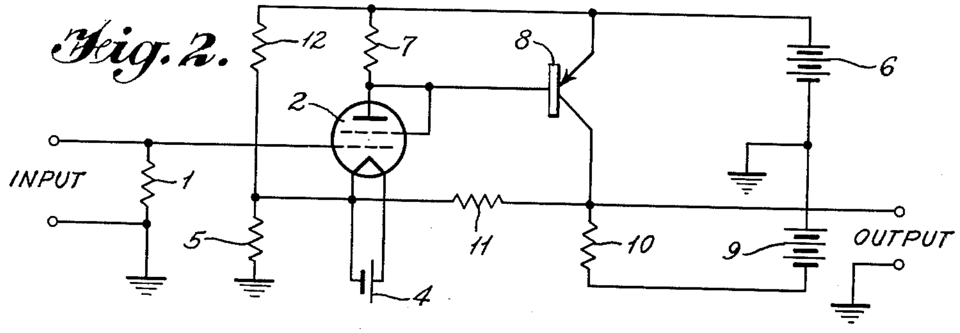
FIG. 2 is a schematic diagram of a modification of the apparatus of FIG. 1.

In certain cases it might not be desirable to use the bias battery of FIG. 1. The apparatus of FIG. 2 employs a voltage divider including resistor 12 and cathode resistor 5 connected across the plate battery 6, to furnish positive bias for the cathode of the electrometer tube. The apparatus is otherwise identical with that of FIG. 1 and will not be further described.

Figure 3:
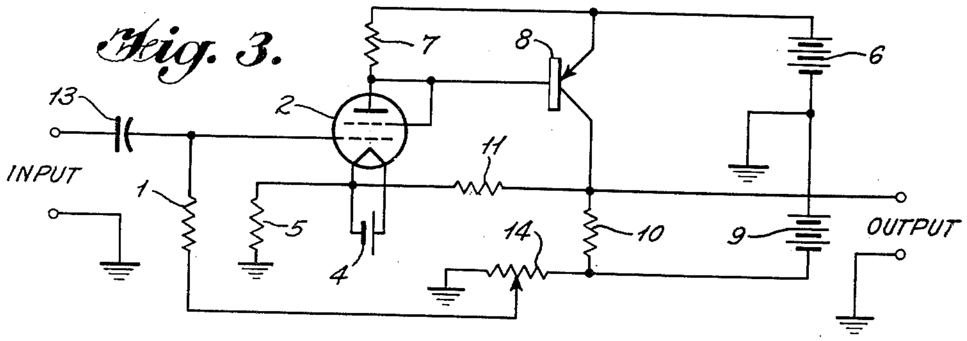
FIG. 3 is a schematic diagram of a further modification of the apparatus of FIG. 1; and, FIG. 4 is a schematic diagram of an embodiment of the invention designed to drive a meter.

In the apparatus of FIG. 3, the signal voltage is capacity-coupled to the amplifier through capacitor 13 connected to the control grid of the electrometer tube 2. Bias voltage is obtained by connecting the grid resistor 1 to the movable contact of a potentiometer 14, which is connected between the negative side of transistor bias battery 9 and ground.

The apparatus of FIG. 3 is otherwise identical with that of FIG. 1 and will not be further described.

Figure 4:
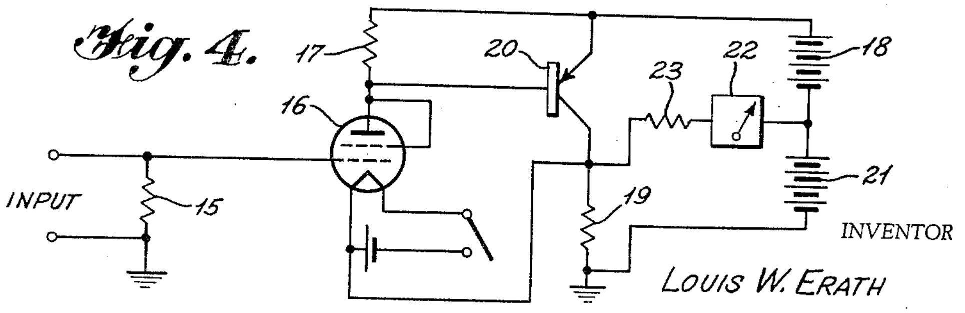

The amplifier of the invention can be used as a unity gain circuit for driving a meter, as well as for amplification purposes. In FIG. 4, the signal to be measured is supplied across grid resistor 15 of electrometer tube 16. The usual plate resistor 17 is connected between the anode of the electrometer tube and the positive side of the plate voltage supply 18, while the usual cathode resistor 19 is connected between the filament of the electrometer tube and ground. As in the amplifier embodiments of FIGS. 1 through 3, the PNP transistor 20 has its base connected to the anode of tube 16 and its emitter connected to the positive side of plate supply 18. The collector of the transistor, however, is connected directly to the filament or cathode of the electrometer tube. Bias voltage for the collector is furnished by battery 21 whose positive side is connected to the negative side of plate supply 18 and whose negative side is grounded. The meter 22 is connected in a series circuit between the junction of the two batteries and the collector of the transistor. A resistor 23 forms part of this series circuit.

The apparatus of FIG. 4 functions in substantially the same manner as that of FIG. 1. However, the circuit is designed for unity gain and is employed to isolate the meter from the voltage to be measured.

The invention has been described in conjunction with preferred embodiments thereof, as shown in the above referred to drawing. It will be understood that many minor modifications could be made in the apparatus without departure from the scope of the invention. In particular, other transistor stages could be added between the PNP transistor shown and the output of the amplifier circuit, and the degenerative feedback resistor could be connected to the output circuit of the entire amplifier and not to the collector of the PNP transistor shown. Consequently, the invention is not to be considered limited to the embodiments disclosed, but rather only by the scope of the appended claims.

I claim:

1. A single ended wideband and D.-C. amplifier including a vacuum tube having at least a cathode, a control grid, and an anode, an input circuit connected between the negative terminal of a first D.-C. voltage source and control grid of said tube for supplying a signal voltage thereto, a plate resistor connected between a positive terminal of said first source and said anode, said cathode being connected through a degenerative resistance, a collector bias resistor, and a second D.-C. source to a negative terminal of said first D.-C. source, said tube and the parameters of its circuits being so chosen that the grid current in the tube is of the order of $10^{-12}$ amperes, a PNP junction transistor having its base directly connected to said anode and its emitter connected to said positive terminal of said first D.-C. source, said collector resistor connected between the collector of said transistor and a negative terminal of said second D.-C. source, the positive terminal of said second D.-C. source being directly connected to the negative terminal of said first D.-C. source.

2. The apparatus of claim 1 including a cathode resistor connected between said cathode and said first-mentioned negative terminal of said first D.-C. source, the gain of the amplifier being selectably by selection of the relative magnitudes of said cathode resistor and said degenerative resistor.

3. The apparatus of claim 1 including means for biasing the grid of said vacuum tube negative with respect to its cathode.

References Cited in the file of this patent

UNITED STATES PATENTS

| | | |
|---|---|---|
| 2,694,181 | Lax | Nov. 9, 1954 |
| 2,879,410 | Loeb | Mar. 4, 1959 |

FOREIGN PATENTS

| | | |
|---|---|---|
| 150,232 | Australia | Feb. 23, 1953 |

OTHER REFERENCES

Starke: "The Transistor, D.C. Amplifier," Radio and Television News, Dec. 1953, pages 82, 83, 148–151.

Langford-Smith: "Radiotron Designer's Handbook," fourth edition, 1952, pages 311, 312, 315 and 307.